US006748141B2

(12) United States Patent
Kennedy et al.

(10) Patent No.: US 6,748,141 B2
(45) Date of Patent: Jun. 8, 2004

(54) METHOD, APPARATUS AND SYSTEM FOR ALIGNING AN OPTICAL FIBER END WITH AN OPTICAL WAVEGUIDE

(75) Inventors: William P Kennedy, Loveland, CO (US); Amanda J Price, Loveland, CO (US); Wallace J Lannen, Ft. Collins, CO (US); John Bernard Medberry, Windsor, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 35 days.

(21) Appl. No.: 10/109,464

(22) Filed: Mar. 28, 2002

(65) Prior Publication Data

US 2003/0185516 A1 Oct. 2, 2003

(51) Int. Cl.[7] .................................................. G02B 6/30
(52) U.S. Cl. ............................. 385/49; 385/31; 385/52; 700/57; 700/192; 700/279
(58) Field of Search ............................. 385/31, 49, 52, 385/88, 92; 700/57, 192, 279

(56) References Cited

U.S. PATENT DOCUMENTS

| | | | | |
|---|---|---|---|---|
| 4,474,423 A | * | 10/1984 | Bisbee et al. .................. 385/52 |
| 5,343,546 A | * | 8/1994 | Cronin et al. .................. 385/52 |
| 5,450,508 A | * | 9/1995 | Decusatis et al. .............. 385/25 |
| 5,926,594 A | * | 7/1999 | Song et al. .................... 385/49 |
| 6,188,472 B1 | * | 2/2001 | Gage et al. ................. 356/73.1 |
| 6,325,551 B1 | * | 12/2001 | Williamson III et al. ..... 385/88 |
| 6,542,673 B1 | * | 4/2003 | Holter et al. .................. 385/52 |
| 2002/0001436 A1 | * | 1/2002 | Park ............................. 385/49 |

FOREIGN PATENT DOCUMENTS

JP          05196831 A   *   8/1993   ............ G02B/6/24

* cited by examiner

*Primary Examiner*—Brian Healy
*Assistant Examiner*—Daniel Petkovsek

(57) ABSTRACT

An alignment system that uses a single optical sensor to enable the end of an optical fiber to be aligned with the input of an optical waveguide of an optical device. In accordance with the present invention, it has been determined that the output of a single optical sensor can be processed and converted into digital signals, which are then further processed in accordance with an alignment algorithm to generate feedback signals that enable precise alignment to be achieved. The alignment system includes the single optical sensor, a lens and processing logic. The processing logic includes an electrical processing circuit that generates an amplified, filtered signal with low noise and a wide dynamic range, an analog-to-digital converter (ADC) that converts the output of the processing circuitry into digital signals and a computer, which processes the digital signals in accordance with the alignment algorithm being executed by the computer to generate the feedback signals that enable the end of the optical fiber to be aligned with the input of the optical waveguide. The feedback signals are sent to a motion control system that is configured to adjust the spatial positioning of the end of the optical fiber in accordance with the feedback signals.

2 Claims, 5 Drawing Sheets

METHOD, APPARATUS AND SYSTEM FOR ALIGNING AN OPTICAL FIBER END WITH AN OPTICAL WAVEGUIDE

TECHNICAL FIELD OF THE INVENTION

The present invention relates generally to optical devices and, more particularly, to a method, apparatus and system for aligning an end of an optical fiber with an optical waveguide of an optical waveguide device.

BACKGROUND OF THE INVENTION

When optical fibers are directly coupled to an input of an optical device in a non-pigtailed configuration, the end of the input optical fiber is secured to an input of an optical waveguide formed in the optical device. Likewise, an end of an output optical fiber is secured to an output of the optical waveguide. The optical fiber ends typically are secured to the input and output of the optical waveguide by adhesive. With these types of optical devices, the ends of the optical fibers are typically directly secured to the inputs and outputs of the optical waveguides.

In the past, alignment of the waveguides of an optical device under test (DUT) was generally performed by injecting light into the input optical fiber secured to the input of the optical waveguide and then measuring the output of the optical fiber secured to the output of the optical waveguide. If the measured output was determined to be correct (i.e., to provide the expected or desirable results), the optical waveguide was deemed to be operating properly. On the other hand, if the measured output did not provide the correct or expected results, the optical waveguide was deemed to be operating improperly. One of the problems associated with this manner of testing is that securing the optical fibers to the waveguide input and output is a waste of time if it is subsequently determined during testing that the waveguide does not function properly.

Currently, alignment systems exist that test the optical device before the ends of the optical fibers are secured to the optical device. Such systems place an end of the input optical fiber in very close proximity to the optical waveguide input, detect the light propagating out of the optical waveguide output, and determine, based on the detected light, whether the optical waveguide is aligned. Once the waveguide is aligned, light propagating out of the output of the optical waveguide can be processed to determine whether the waveguide is operating properly. Thus, the input and output optical fibers are not secured to the inputs and outputs of the optical waveguides of an optical device until after all of the optical waveguides have been tested and a determination has been made that the optical waveguides are operating properly. If a determination is made that one or more optical waveguides are not functioning properly, the optical fibers are not secured to the optical device, and thus no time is wasted securing optical fibers to a defective optical device that will not be shipped to a customer.

The known alignment systems utilize an infrared (IR) camera that is positioned to view the outputs of one or more optical waveguides of the optical device. The IR camera converts the IR signals into electrical signals, which are then processed and displayed on a display device. Based on the displayed information, the optical fiber end is moved with respect to the optical device until it is determined that alignment of the optical fiber end and the input of the optical waveguide has been achieved. As the end of the optical fiber is moved, the output from the IR camera is processed to determine whether alignment has been achieved.

In some of these types of alignment systems, the process of adjusting the position of the optical fiber end until alignment is achieved is performed manually by a human operator who looks at the display device and determines, based on the displayed information, whether alignment has been achieved or whether the position of the fiber end needs to be spatially adjusted. Generally, the operator moves the fiber end until the operator is satisfied that the fiber end is aligned with the optical waveguide. In other alignment systems, the process of moving the end of the optical fiber until alignment is achieved is automated. Some of the disadvantages of the manual alignment approach are that it is prone to human error, subjective, difficult to teach and time consuming to perform.

One of the advantages of the known manual and automated alignment systems is that, because the camera has many optical detector elements (i.e., pixels), the camera sees both spatial resolution as well as light intensity distribution. However, one of the disadvantages of using a camera for this purpose is that it must first be calibrated to the optical fiber before the alignment process can begin. A calibration algorithm must be performed to detect the end of the optical fiber in order to ensure that the camera is viewing the correct object area. Because performing this type of detection is relatively complicated, the calibration algorithm is processing intensive. Once the calibration is complete, then the alignment algorithm can begin being executed.

During the alignment algorithm, at least a thousand pixels per frame must be processed, and many frames must be processed. Processing this much information further increases processing overhead of the computer that executes the alignment algorithm. Furthermore, the frame rate of the IR camera is relatively slow (e.g., about 30 frames per second), which limits the speed at which the alignment information is output to and processed by the computer. All of these factors limit the speed at which the alignment process, both manual and automated, can be performed.

In addition, the costs associated with purchasing the IR camera, developing the calibration and alignment software, and integrating the software with the IR camera is relatively expensive. Accordingly, a need exists for an alignment system that enables precise alignment to be consistently achieved without requiring a large amount of processing overhead. A need also exists for an alignment system that is well suited for automation and that enables the automation process to be performed at relatively high speeds. A further need exists for an alignment system that is relatively inexpensive compared to known alignment systems.

SUMMARY OF THE INVENTION

In accordance with the present invention, it has been determined that the output of a single optical sensor can be processed and converted into digital signals, which are then further processed in accordance with an alignment algorithm that generates feedback signals that are sent to a motion control system that is capable of adjusting the spatial positioning of the optical fiber end until alignment between the end of the optical fiber and the input of an optical waveguide of an optical device is achieved. The alignment system includes a single optical sensor, a lens and processing logic. The processing logic includes an electrical processing circuit that generates an amplified, filtered signal with low noise and a wide dynamic range, an analog-to-digital converter (ADC) that converts the output of the electrical processing circuitry into digital signals, and a computer, which processes the digital signals in accordance with the alignment algorithm to generate the feedback signals that enable the end of the optical fiber to be aligned with the input of the optical waveguide.

Once the optical fiber end is aligned with the input of the optical waveguide, the spatially aligned position of the end of the optical fiber is maintained. This enables the optical device to be tested for defects by measuring and analyzing the output of the optical waveguide, although the present invention is usable for other applications. Known motion control systems and motion control algorithms can be utilized in conjunction with the method and apparatus of the present invention to spatially position the end of the optical fiber.

By using a single optical sensor to achieve alignment, as opposed to a camera, the cost of the alignment system is greatly reduced. Furthermore, since the alignment algorithm is only required to deal with the output of a single optical sensor, as opposed to potentially thousands of pixels of an IR camera, the processing overhead associated with performing the alignment algorithm is relatively low. This low processing overhead enables alignment to be achieved relatively quickly using a relatively low cost alignment system.

These and other features and advantages of the present invention will become apparent from the following description, drawings and claims.

DETAILED DESCRIPTION OF THE PREFERRED EMBODIMENT

Figure 1:
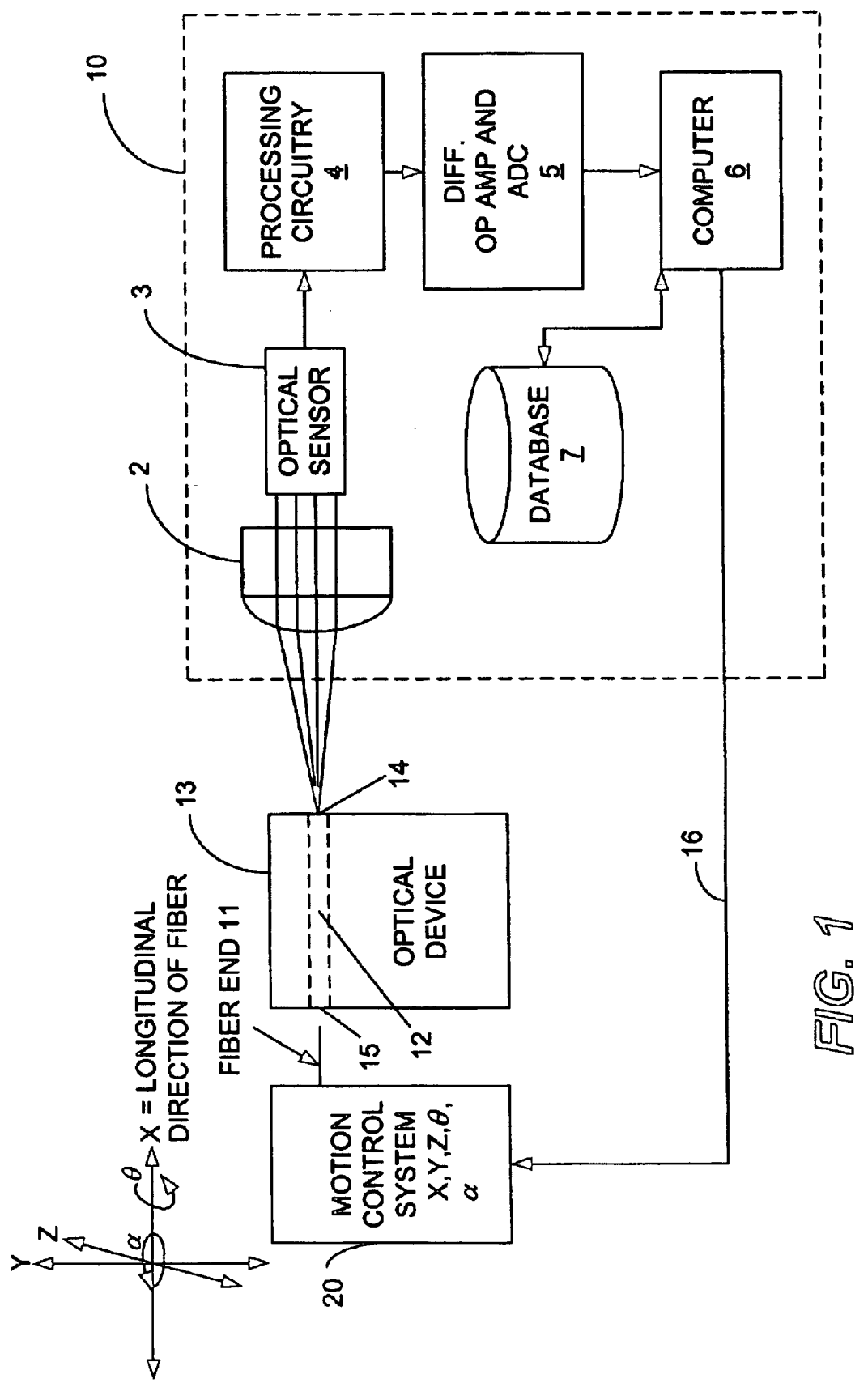
FIG. 1 is a block diagram of the alignment system of the present invention, which generates feedback signals that are used by a motion control system to align an end of an optical fiber with an optical waveguide.

As stated above, in accordance with the present invention, it has been determined that the output of a single optical sensor can be processed by processing logic, which performs an alignment algorithm designed to process the output of the optical sensor in a particular manner to generate feedback signals that enable alignment to be achieved quickly and with low processing overhead. FIG. 1 is a block diagram of the alignment system 10 of the present invention in accordance with an example embodiment. The alignment system 10 generates feedback signals that are provided to a motion control system 20. The motion control system 20 preferably is a five-axle motion control system comprising a stage (not shown) that is controlled by the five respective linear drive motors (not shown) that enable the end 11 of the optical fiber to be moved in the X, Y and Z planes and to be rotated in two planes, as indicated by the symbols θ and α. The symbol ζ corresponds to rotation of the optical fiber about its longitudinal axis (in this case, the X-axis), which is commonly referred to as the "roll". The symbol α, which represents the "yaw", corresponds to rotation of the longitudinal axis of the optical fiber in the X, Y plane about the Z-axis. Some motion control systems include a sixth axle for controlling the pitch of the optical fiber end. The pitch of the optical fiber, in the context of the present invention, would correspond to rotation of the optical fiber in the X, Z plane about the Y-axis. Any such motion control system is suitable for use with the present invention.

The linear drive motors interface with a processor (not shown) that controls the motion of the five axles via their respective motors and records their respective positions. The processor of the motion control system 20 receives the feedback signals output from the computer 6 and controls the motion of the axles in accordance with the feedback signals. The motion control system 20 is not limited to any particular configuration, with the exception that it should be capable of moving the end of the fiber in at least the vertical and horizontal positions with relatively high precision. The interaction between the alignment system 10 of the present invention and the motion control system 20 will be described below in detail with reference to FIGS. 3A, 3B and 4.

The alignment system 10 comprises a lens 2, an optical sensor 3 and processing logic, which includes processing circuitry 4, a differential operational amplifier followed by an analog-to-digital converter (ADC) 5, a computer 6 and a memory element 7. The lens 2 may be, for example, a plano-convex lens. The lens 2 receives light projected from the end 11 as it propagates through optical waveguide 12 of the optical device under test (DUT) 13. As the light leaves the output 14 of the optical waveguide 12, the light forms a cone-shaped beam, which the lens 2 collimates onto the optical sensor 3. The optical sensor 3 preferably is a photodiode. Many photodiodes that are suitable for this purpose are available in the market. Likewise, many different lenses and lens configurations that are suitable for performing the function of lens 2 (i.e., focusing the light onto the optical sensor 3) are available in the market.

The optical sensor 3 produces an electrical signal that is related to the amount, or intensity, of light impinging on it. The electrical signals produced by the optical sensor 3 are output to processing circuitry 4. The processing circuitry 4 amplifies the signals to a suitable gain and filters noise out of the signal. The ADC 5 receives the amplified and filtered analog signal and converts it into a digital signal for processing by computer 6. The computer 6 uses data stored in the memory element 7 in combination with the digital signal received from the ADC 5 to determine whether the fiber end 11 is aligned with the input 15 of the optical waveguide 12. The computer outputs feedback signals, which are represented by line 16, to the motion control system 20, which adjusts the spatial position of the end 11 of the optical fiber in accordance with the received feedback signals.

The computer 6 executes an alignment algorithm to determine whether alignment has been achieved, and if not, sends feedback signals to cause the motion control system 20 to adjust the position of the end 11 of the optical fiber. This process is iterated until the computer 6 determines that the fiber end 11 is aligned with the input 15 of the optical waveguide 12. The motion control system 20 then maintains the fiber end 11 at the aligned position to enable testing of the optical waveguide to be performed.

The positioning of the optical sensor 3 is relative to the positioning of the lens 2. The positioning of the lens 2 is selected to achieve the desired field of view (FOV) of the output 14 of the optical waveguide 12. In FIG. 1, the optical DUT 13 is shown as having a single optical waveguide, and thus the lens 2 is positioned a particular distance away from the output 14 of the optical waveguide 12 that provides it with a FOV that enables it to receive the cone-shaped beam from the output 14, collimate the beam, and focus it on the optical sensor 3.

Figure 2:
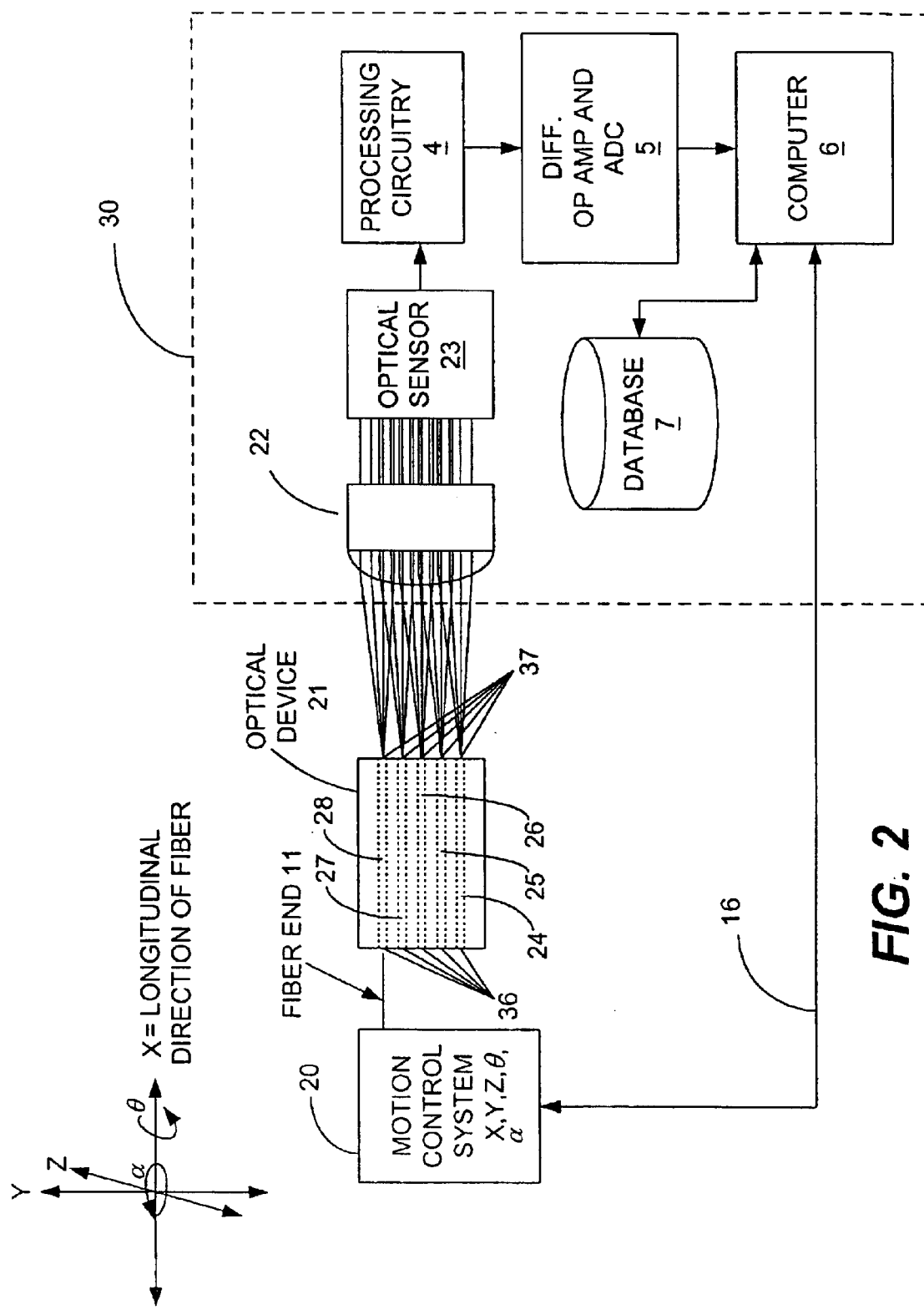
FIG. 2 is a block diagram of the alignment system of the present invention, which generates feedback signals that are used by a motion control system to align an end of an optical fiber with multiple optical waveguides that can be seen by the optical sensor of the alignment system.

FIG. 2 illustrates the alignment system 30 of the present invention in accordance with another embodiment in which the lens 22 has a FOV that enables it to view multiple (e.g., 5) optical waveguides 24-28 and to collimate and focus the light from each of the outputs 37 of the optical waveguides 24-28. The optical sensor 23 may be, for example, a 1 to 5 millimeter (mm) photodiode, although it is not limited to any particular size or geometry. The optical sensor 23 preferably is a 3 millimeter InGaAs photodiode with a very low noise floor, as described in more detail below with reference to FIG. 5. Although the lenses 2 and 22 and the optical sensors 3 and 23 are shown in FIGS. 1 and 2 as being more or less axially aligned with the outputs of the optical waveguides, this is not necessary and, in some cases, will not be the case. Also, the optical waveguides are shown as being linear, which also is noy necessary, and will not be true in all cases. The shapes of the optical waveguides will depend on their functions and on the nature of the optical device. The lenses 2 and 22 may be at an angle with respect to the sides of the optical devices 13 and 21 that are closest to the lenses 2 and 22 in order to provide the lenses 2 and 22 with a FOV that enables the lenses to "see" all of the outputs of all of the waveguides. Likewise, the optical sensors 3 and 23 may be offset to enable the light received by lenses 2 and 22 to be focused onto the optical sensors 3 and 23. Essentially, the lens system and optical sensor can be configured and positioned to enable an optical fiber end 11 to be aligned with multiple waveguide inputs by the alignment system of the present invention.

Figure 3A:
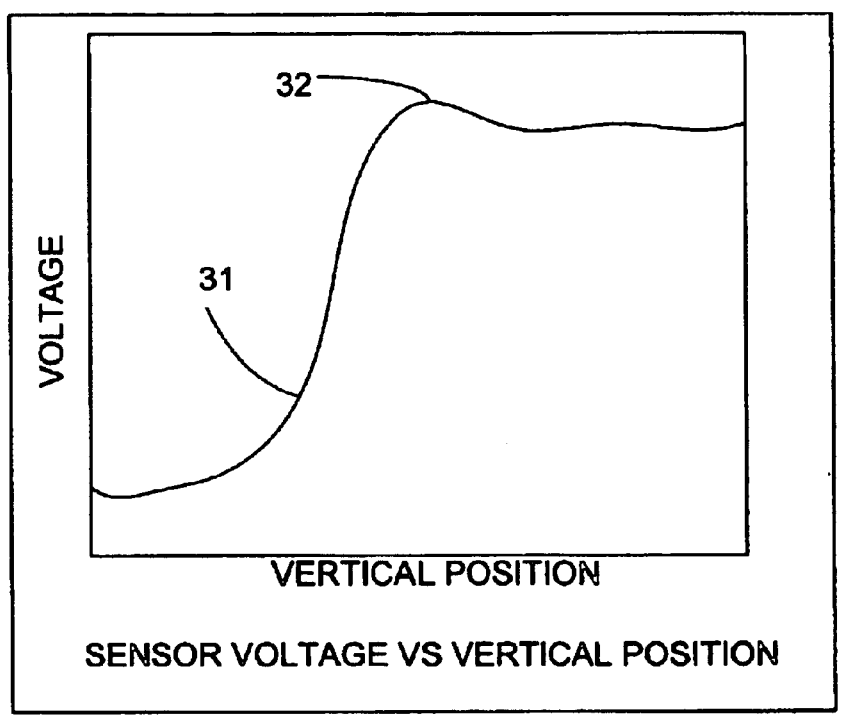
FIG. 3A is a graph illustrating the optical sensor output voltage as a function of the vertical position of the end of the optical fiber with respect to an optical waveguide input.
Figure 3B:
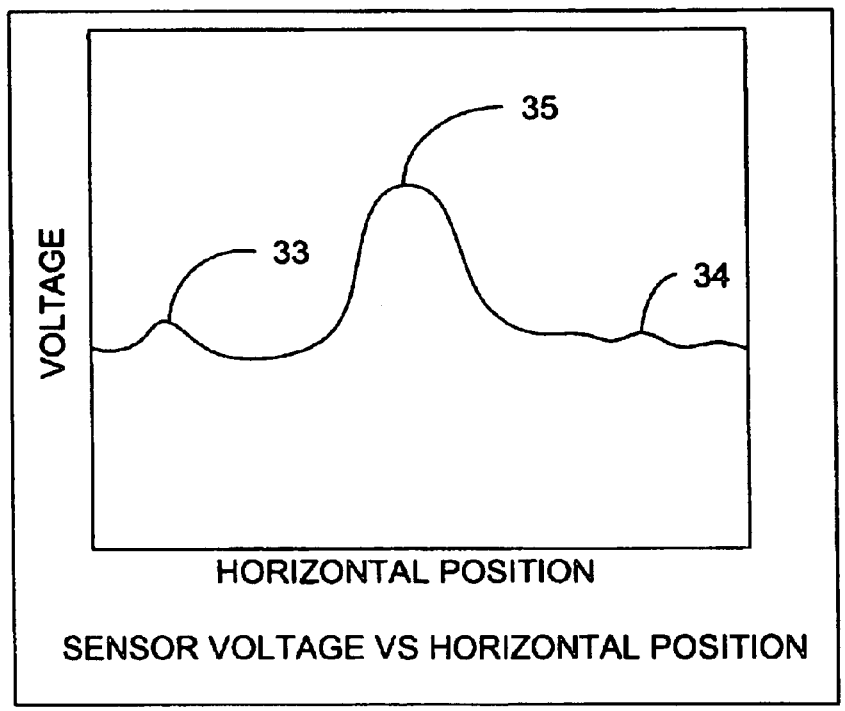
FIG. 3B is a graph illustrating the optical sensor output voltage as a function of the horizontal position of the end of the optical fiber with respect to an optical waveguide input.

The graphs of FIGS. 3A and 3B will be described in conjunction with the flow chart of FIG. 4 to illustrate the manner in which the single-sensor configuration can be used to determine when the end 11 of the optical fiber is aligned with the input of an optical waveguide. Assuming that the optical DUT is multi-layered, the layer in which a waveguide is formed must first be determined. To accomplish this, the motion control system 20 performs at least one vertical scan with the end 11 of the optical fiber, as indicated by block 41 of FIG. 4. FIG. 3A is a graph illustrating the digital voltage signals received by the computer 6 as a function of the vertical position of the optical fiber end, which is outputting light during the scanning process.

The scanning operations occur within a small window of movement, which may be, for example, 50 micrometers (microns) wide in the X plane and 200 microns in the Y plane. This window depends on the size of the DUT and other implementation details associated with the configurations of the alignment and motion control systems. Therefore, the present invention is not limited to the extent to which the vertical scanning is performed. A typical DUT may be on the order of, for example, a millimeter in the X, Y and Z dimensions. The linear drive motors in accordance with this example embodiment are capable of moving the fiber end 11 in steps of 0.01 millimeters in the X, Y and Z directions. Once the Z coordinate location of the fiber end 11 has been set, the fiber end 11 is scanned upwards or downwards in the vertical (i.e., Y) direction within the window. As the fiber end is scanned, the voltage level associated with the output of the optical sensor (3 or 23) is determined at each step by the alignment algorithm being executed by the computer 6.

As seen in the graph of FIG. 3A, the voltage levels are low, as indicated by the portion of the curve labeled 31, for a number of vertical positions after the vertical scan begins. However, the voltage levels increase sharply, as indicated by peak 32, to a relatively high voltage level at a particular vertical position and remain high over some number of vertical positions. The low voltage level corresponds to a layer that does not comprise the waveguide whereas the high voltage level corresponds to the waveguide layer. This change in voltage level is indicative of the fact that more light propagates through the layer containing the waveguide than through the layers on either side of it, which of course are less transmissive than the waveguide layer, and possibly opaque.

Figure 4:
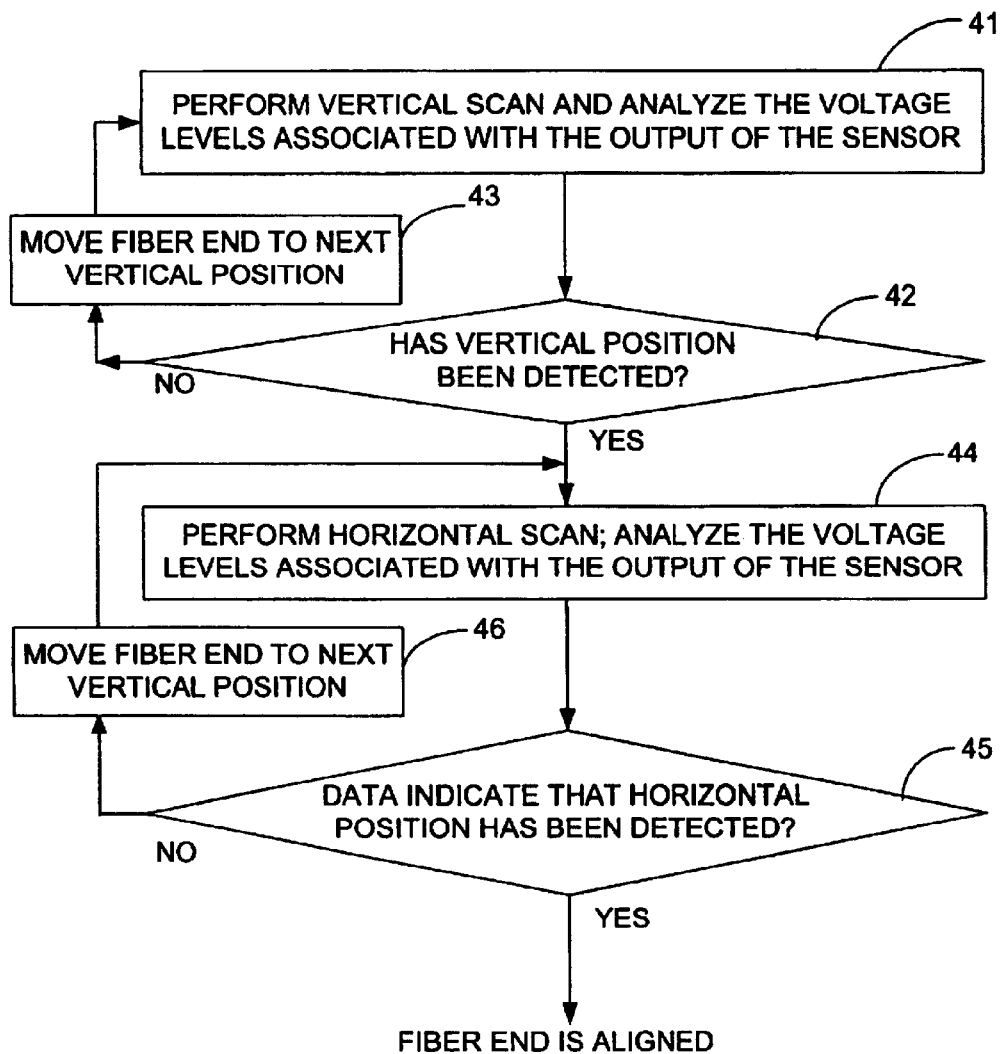
FIG. 4 is a flow chart illustrating the method of the present invention in accordance with an example embodiment.

The computer 6 executing the alignment algorithm of the present invention analyzes the voltage levels and determines when this peak voltage represented by peak 32 has been detected, as also indicated by block 41 in FIG. 4. Until this peak voltage is detected, the vertical scan continues and the alignment algorithm continues to analyze the voltage levels to find the peak at different vertical positions, as indicated by block 42 and 43 in FIG. 4. When the computer 6 determines that this peak voltage has been detected, the fiber end 11 is maintained by the motion control system at the Y position corresponding to the peak. One or more subsequent vertical scans may be performed at different X positions within the window to corroborate the results of the first scan.

Once the layer in which the waveguide exists has been detected, then a horizontal scan is performed to determine the precise location of the waveguide within the waveguide layer, as indicated by block 44 in FIG. 4. The horizontal scan may be from one end of the DUT to the other in the X plane, or within a smaller window. FIG. 3B is a graph illustrating the voltage levels as a function of horizontal positioning (i.e., X direction) of the fiber end 11. The voltage level may vary a small amount over a number of X positions, as indicated by small peaks 33 and 34, but one peak will be greater than all of the others and will correspond to the X position of the waveguide. The peak 35 in FIG. 3B corresponds to the maximum voltage level and to the X position of the waveguide. Since voltage peaks caused by noise can occur and can even be greater than the peak that actually corresponds to waveguide, the alignment algorithm of the present invention preferably continues to analyze the voltage level data until the actual peak that corresponds to the X position of the waveguide has been detected, as indicated by blocks 45 and 46. The alignment algorithm can be written to ignore very low voltage level peaks by using a minimum threshold voltage level that must be detected before a peak will be considered as corresponding to the X position of the waveguide, although this is not necessary.

In order to determine whether a peak corresponds to the X position of the waveguide, the computer 6 executing the alignment algorithm preferably analyzes the voltage levels on both sides peak over one or more X positions to determine whether the peak corresponds to a Gaussian distribution. Noise typically will not have a Gaussian distribution. The peak that corresponds to the X position of the waveguide will be a Gaussian function due to the fact that the light emitted from the output of a waveguide corresponds to a Gaussian distribution. Therefore, if the alignment algorithm determines that a detected peak corresponds to a Gaussian distribution, the alignment algorithm determines that the peak that corresponds to the X position of the waveguide has been detected.

When multiple waveguides exist in respective layers of the DUT, the location of the waveguide can be determined in the manner discussed above, except that additional processing may be performed to determine whether the Y position has been detected that corresponds to the waveguide layer under consideration. If the motion control system 20 has information regarding the particular DUT, such as its dimensions and the number of waveguides formed therein, the motion control system 20 may simply move the fiber end 11 to an X-by-Y window that includes the waveguide layer and the layers on either side of it. The vertical scanning process will then enable the waveguide layer to be located. The horizontal scanning process will then be performed in the manner discussed above with reference to FIGS. 3A, 3B and 4.

Alternatively, if the computer 6, rather than the processor of the motion control system, is provided with information about the DUT, such as which of the layers correspond to the waveguides, the distance between the layers, etc., this information will be stored in memory element 7 so that it can be accessed by the computer 6 during or prior to execution of the alignment algorithm. In this case, the computer 6 may cause the motion control system 20 to perform the Y scan process one or more times until the information relating to the DUT matches up with the information stored in memory element 7 for a particular layer. Once the alignment algorithm determines that the correct Y position has been obtained, it will cause the computer 6 to output feedback signals that control the processor of the motion control system 20 to perform the above-described horizontal scanning process to locate the waveguide.

Alternatively, a pre-alignment algorithm may be performed for each DUT category using a DUT from each category. To accomplish this, signatures relating to the layers of the DUT are obtained and stored in memory element 7. The DUT is vertically scanned and the X, Y and Z coordinates are known at every position of the fiber end 11 and are stored in memory element 7. The double-headed arrow pointing from the motion control system 20 to the computer 6 is intended to indicated that the computer 6 receives these coordinates and stores them in memory element 7. At the same time, the output of the optical sensor 3 and 23 is being measured and stored in memory element 7. The computer 6 uses all of this data to generate a one-to-one mapping between spatial position and output voltage. From this one-to-one mapping, a signature for each layer of the DUT can be obtained. The stored signatures may be compared with the signatures generated in real time when performing the vertical and horizontal scanning operations to determine when an optical waveguide has been found in a particular layer.

The signatures may be comprised of certain indicators, such as the extrema and an inflection point of the output voltage as a function of vertical position. An inflection point indicates a change in slope of the output voltage as a function of vertical position. One or more extrema may be included in the signature. The extrema generally indicate when there is a maximum or a minimum output voltage as a function of vertical position. The inflection points correspond to a change in the output voltage as a function of a change in the vertical direction. The extrema and inflection points can be used to generate a signature for each layer of the device, which enables the computer 6 to send feedback signals to the motion control system 20 to move the fiber end 11 in the vertical direction until the signature being generated in real time matches a signature stored in memory that corresponds to the vertical position of the layer being sought. Once the vertical position has been found to within a particular X-by-Y window, the horizontal scanning operation discussed above can be performed to align the fiber end with the waveguide.

Figure 5:
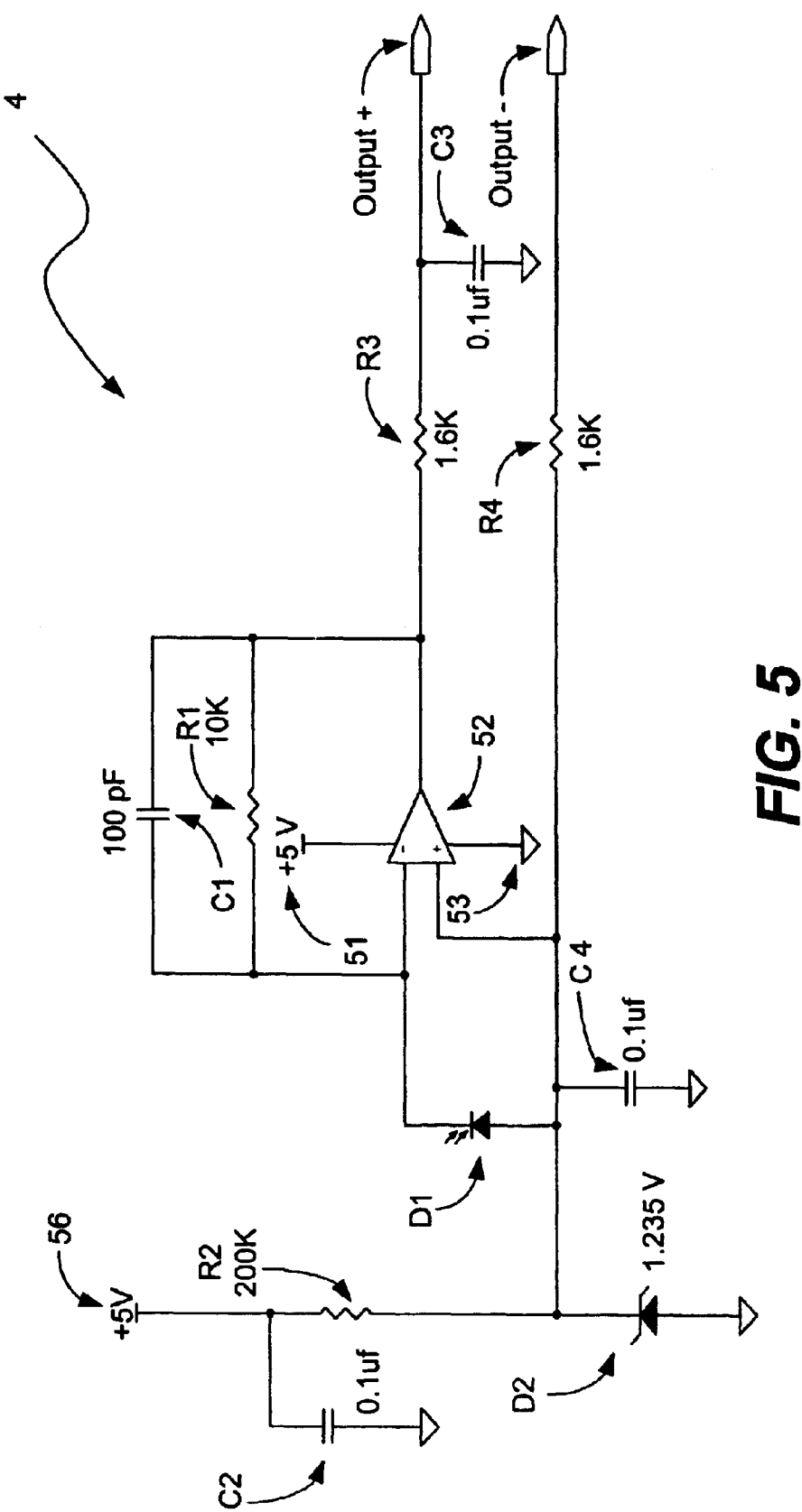
FIG. 5 is a schematic diagram of the processing circuitry of the alignment system of the present invention in accordance with an example embodiment.

FIG. 5 is a schematic diagram of the processing circuitry 4 shown in FIGS. 1 and 2 in accordance with an example embodiment. However, there are many ways in which the functions performed by the processing circuitry can be implemented. The processing circuitry 4 performs two primary functions, namely, filtering noise and providing the output signals from the optical sensor 3 with sufficient gain to be converted by the op-amp/ADC 5 into a digital signal that is suitable for processing by the computer 6. However, the circuitry 4 shown in FIG. 5 has been specifically configured to 1) provide a wide dynamic range for the output of optical sensor 3 and 23 so that voltage levels within a broad range can be digitized into high-resolution digital numbers that contain a large amount of meaningful information, 2) to provid a low noise floor, and 3) to eliminate or reduce noise in the optical sensor output signal 4) to be capable of being implemented at low cost and with only one power supply.

The ADC 5 may be, for example, a 16-bit ADC, which is capable of converting a wide range of analog voltage levels into 16-bit digital values. D1 represents the optical sensor 3 shown in FIGS. 1 and 2 and preferably is a photodiode operating in the photovoltaic mode. The amplifier 52 is an operational amplifier having a very low bias current and a very low offset voltage. This provides the circuitry with a very broad dynamic range. This means that the processing circuitry 4 is capable of detecting the low output voltages of the optical sensor and of amplifying them to a suitable level, but prevents the amplifier 52 from going into saturation when the optical sensor outputs high voltages, such as when a waveguide is detected. Therefore, when a waveguide is being detected, but the fiber end is not precisely aligned with the waveguide, the amplifier 52 will not saturate, but will continue to have a voltage level proportional to the amount of light being received thereby. This enables the alignment system to be very precise.

The current output from the diode D1 is proportional to the amount of light impinging on the diode. The photodiode D1 is mounted in a housing (not shown) that prevents at least substantially all light, other than the light projected from the end 11 of the optical fiber, from impinging on it. The electrical processing circuit 4 comprises a transimpedance amplifier 52, which enables the amplifier 52 to convert current into voltage. The output of the diode is an electrical current that is converted by the amplifier 52 into a voltage signal. The output of the photodiode D1 is connected to the inverting terminal of the amplifier 52. The amplifier 52 produces a voltage that is proportional to the current output from the photodiode D1. That output voltage is produced when the D1 current flows through the feedback resistor R1 to the output. The value of R1 may be, for example, 10,000 ohms (10 KΩ). The capacitor, C1, in the feedback loop provides stability and prevents the output of the amplifier 52 from oscillating by filtering out high frequency noise. The value of C1 may be, for example, 100 Picofarads (pF).

The output voltage of the amplifier 52 passes through a resistor R3, which may be, for example, 1.6 KΩ. After the resistor R3, there is a parallel capacitor, C3, to ground. The value of the capacitor C3 may be, for example, 0.1 pF. This capacitor acts as a lowpass filter, which filters noise out of the output signal at the "Output +" terminal. The diode D2 provides a second reference voltage at the positive terminal of the amplifier 52, which eliminates the need for a second power supply for the amplifier. The reference voltage provided by D2 may be, for example, 1.235 volts. Thus, the circuit 4 utilizes a single 5 volt power supply 51 for the amplifier 52. The negative voltage supply terminal 55 is tied to ground, as shown. By biasing the reference voltage at the positive input terminal of the amplifier 52 up by 1.235 volts, the inputs of the amplifier 52 are prevented from being at the positive and/or negative rails of the amplifier 52, which is desirable for this particular amplifier 52 and for this particular implementation of the electrical processing circuitry 4. If the supplies of the amplifier 52 were allowed to go to the positive and negative rails, noise would be injected into the output signal of the amplifier and some linearity would be lost.

The +5 volt supply 56 is provided from the same voltage supply that provides the +5 volt supply voltage to the amplifier 52. The capacitor C2 removes noise from the supply voltage 56. C2 may have a value of, for example, 0.1 microfarads ($\mu F$). R2 limits the current flowing through D2. The capacitor C4 is a bypass capacitor that stabilizes the 1.235 reference voltage at the positive input terminal of the amplifier 52. The value of the capacitor C4 may be, for example, 0.1 $\mu F$. The resistor R4 serves the purpose of matching the impedance of both output voltages "Output+" and "Output−". The value of the resistor R4 may be, for example, 1.6 K$\omega$.

Of course, the current output from the photodiode could be converted into voltage by using other implementations, such as by placing a resistor in series with the output of the photodiode D1 to convert the current into a voltage signal. However, the extra resistor may generate additional noise, which is undesirable. Also, if a separate negative supply voltage was tied to supply terminal 55 of the operational amplifier 52, the processing circuitry 4 would have a single output, as opposed to the two outputs shown. In this case, the components D2, R2, C2, R4 and C4 would not be required. However, the example embodiment shown in FIG. 5 provides a large dynamic range of outputs of the photodiode D1 and minimizes noise, which makes the processing circuitry very precise. Also, a separate power supply would increase the costs associated with the processing circuitry 4, increase the overall size of the processing circuitry 4. The example embodiment shown in FIG. 5 enables the processing circuitry 4 to be placed on a very small printed circuit board (not shown), with the photodiode D1 being the largest component on the board.

With reference again to FIGS. 1 and 2, the two outputs of the processing circuitry 4 are input to a differential operational amplifier, the output of which is input to an ADC, as indicated by block 5. The differential amplifier receives the "Output +" signal at its positive, non-inverting terminal and the "Output −" signal at its negative, inverting terminal. The output of the differential operational amplifier is an analog voltage signal equal to the difference between the "Output +" signal and the "Output −" signal. This analog difference signal is received by the ADC, which converts the analog signal into a digital signal that can be understood by the alignment algorithm of the present invention being executed by the computer 6.

The sampling rate of the ADC should be sufficiently high (e.g., at least 1000 samples per second). The sample rate depends on the ADC selected for this purpose. In the example embodiment shown, the ADC produces a 16-bit digital value for each sample, which is then input to computer 6. The computer 6 analyzes the digital signals as they are generated in real time during the vertical and horizontal scanning operations and sends feedback signals to the motion control system 20, as discussed above with reference to FIGS. 3A-4. This process continues until the computer 6 makes the determination that the fiber end 11 is aligned with the waveguide under consideration.

It should be noted that the embodiments described herein are only examples of particular ways in which the present invention could be implemented. As stated above, the present invention is not limited to the particular implementation details illustrated in the drawings. For example, many implementations of the processing circuitry 4 could be derived that would perform the functions which need to be performed by the processing circuitry 4. Also, the present invention is not limited to any particular lens system for focusing the light output from the DUT onto the optical sensor. Moreover, the optical sensor of the present invention is not limited to any particular optical sensor. Preferably the optical sensor is a photodiode, such as a three millimeter (mm) photodiode. Preferably the lens is a plano convex lens that is 5.2 mm thick, 5.0 mm in diameter, that has a 10 mm focal length, and is anti-reflection coated at 1550 nanometers (nm). The lens in FIGS. 1 and 2 preferably is located approximately 10 mm from the DUT side that comprises the output(s) of the waveguide(s). Such a lens is currently available from CVI Laser Corporation. However, those skilled in the art will understand in view of the discussion provided herein that the present invention is not limited to any of these particular implementations and that many variations may be made to the example embodiments and components discussed herein that are within the scope of the present invention.

What is claimed is:

1. An alignment computer program for aligning an end of an optical fiber with an input of an optical waveguide of an optical device, the program being embodied on a computer readable medium, the program comprising:

an alignment routine for processing electrical signals produced by a single optical sensor that have been converted into digital signals by an analog-to-digital converter to determine whether or not the end of the optical fiber is aligned with the input of the optical waveguide, wherein the alignment routine comprises:

a first code segment for analyzing the digital signals corresponding to electrical signals output from a single optical sensor when light from an output of the optical waveguide is focused by a lens onto the single optical sensor the first code segment analyzing the digital signals to determine whether the end of the optical fiber is aligned with the input of the optical waveguide;

a second code segment for generating feedback signals in accordance with the determination made by the first code segment; and a third code segment for causing the feedback signals to be sent to a motion control system that controls the motion and positioning of the end of the optical fiber.

2. The program of claim 1 wherein the routine is performed repeatedly, if necessary, until the first code segment determines that the end of the optical fiber is aligned with the input of the optical waveguide.

* * * * *